Patented May 24, 1932

1,860,003

UNITED STATES PATENT OFFICE

EDWIN C. WHITE, OF BALTIMORE, MARYLAND, ASSIGNOR TO HYNSON, WESTCOTT AND DUNNING INC., A CORPORATION OF MARYLAND

MERCURY DERIVATIVE OF HALOGENATED FLUORESCEINS

No Drawing.     Application filed November 18, 1925.  Serial No. 69,930.

Mercury derivatives of certain halogenated fluoresceins have been described, but these derivatives are limited as to the nature of the halogens, their position in the fluorescein molecule and their number. This invention relates to mercury derivatives of certain halogenated fluoresceins which have heretofore not been subjected to the mercuration process. The physiological properties of these mercury derivatives vary with the nature, position and number of the halogen atoms.

Fluorescein contains three benzene rings, two of them of phenolic character; the other ring contains no phenolic group, and will be referred to as the phthalic acid ring. In order to indicate conveniently the positions of the halogens in the hereinafter mentioned substances, the arbitrary designation "$\alpha$" will be applied before the names of halogens which lie in the phenolic rings, and the arbitrary designation "$\beta$" will be applied before the names of halogens which lie in the phthalic acid ring. Thus, $\alpha$-di-iodo-$\beta$-tetrabromfluorescein signifies a fluorescein in which two iodine atoms are substituted in the phenolic rings and four bromine atoms are substituted in the phthalic acid ring.

The following classes of parent substances are included within the scope of the invention:

I. $\alpha$-dihalogeno-fluoresceins, having most probably the general formula:

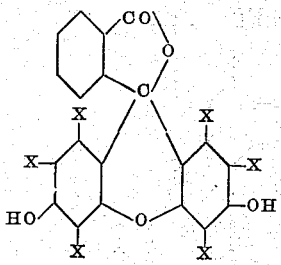

wherein X represents hydrogen or halogen, two X's being halogens, specifically $\alpha$-dichloro-fluorescein and $\alpha$-di-iodo-fluorescein.

II. $\alpha$-dihalogeno-$\beta$-dihalogeno-fluoresceins, having most probably the general formula:

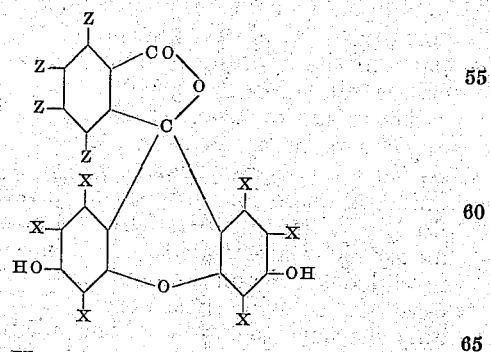

wherein X represents hydrogen or halogen, two X's being halogens, and Z represents hydrogen or halogen, two Z's being halogens.

III. $\beta$-dihalogeno-fluoresceins, having most probably the general formula:

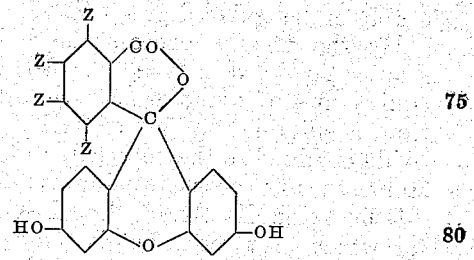

wherein Z represents hydrogen or halogen, two Z's being halogens, specifically $\beta$-dibromfluorescein and $\beta$-di-iodo-fluorescein.

IV. $\beta$-tetrahalogeno-fluoresceins, having most probably the general formula:

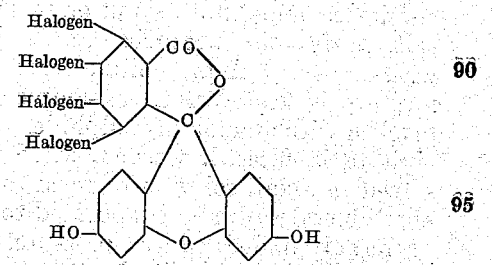

specifically $\beta$-tetrabrom-fluorescein and $\beta$-tetraiodo-fluorescein.

V. α-dihalogeno-β-tetrahalogeno-fluoresceins, having most probably the general formula:

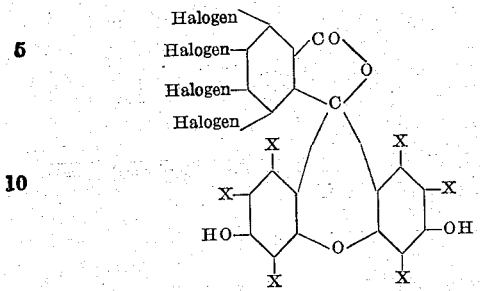

wherein X represents hydrogen or halogen, two X's being halogens. All combinations of six halogen atoms to the molecule, conforming to this distribution in the several parts of the fluorescein molecule, are specifically included in this group.

These substances may be mercurated by any one of three processes. By the first process the halogenated fluorescein is dissolved in an alkali solution and reprecipitated in a finely divided condition by the addition of an excess of acetic acid. To this suspension is added a suitable amount, but not an excess, of a solution of a mercury salt, preferably mercuric acetate, and the mixture, well stirred, is heated until a sample of the mixture does not blacken with ammonium sulphide solution. The precipitate is filtered, washed and dried and converted to an alkali metal salt by solution in caustic alkali, and the salt solution evaporated to dryness, preferably under reduced pressure.

By the second process the halogenated fluorescein is dissolved in two molecular equivalents of standard caustic alkali solution, a suitable amount of yellow mercuric oxide is added to the solution, and with constant stirring the suspension is heated until all the oxide dissolves. Any insoluble matter which may settle out is removed by filtration and the solution is then evaporated to dryness, preferably under reduced pressure.

By the third process the halogenated fluorescein is dissolved in two molecular equivalents of a standard caustic alkali solution, a suitable amount of a solution of a mercury salt, preferably mercuric acetate, is added with stirring. A precipitate forms, and the mixture is heated until a sample does not blacken with ammonium sulphide. The precipitate is filtered, washed, dried and dissolved in alkali solution to form the soluble alkali metal salt, and evaporated to dryness, preferably under reduced pressure.

In the above described processes the expression "a suitable amount" has been used in referring to the mercury salts or mercuric oxide used. The meaning of this is as follows: The amount of mercury that can readily enter the rings of a halogenated fluorescein depends upon the number of halogen atoms lying in the α-positions. In those fluoresceins containing no α-halogens, one, two, three or four atoms of mercury can enter the fluorescein molecule, but in those containing two α-halogens only one or two atoms of mercury enter. In any individual case, then, the amount of mercury used will depend upon the degree of saturation with mercury that is desired, within the limit set by the number of α-halogens present.

It is believed that mercury enters the phenolic rings, and presumably in positions ortho to the hydroxyl groups, as the mercury derivatives formed dissolve in alkali solutions and do not blacken readily in the cold, with ammonium sulphide. The susceptibility to blackening with this reagent varies with time of contact and temperature, and varies among the different mercury derivatives.

From the foregoing, therefore, it follows that the mercury-containing reaction products obtained by the mercuration, by any one of the three processes just disclosed, of parent substances of the five classes hereinbefore set out, may be represented by the following general formulæ, it being understood that said formulæ are based upon purely theoretical considerations:

I. Mercury derivatives of α-dihalogeno-fluoresceins having most probably the general formula:

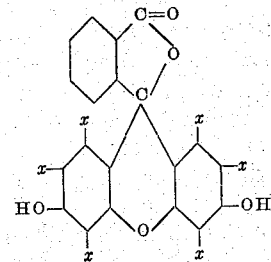

wherein $x$ represents hydrogen, halogen or mercury, two $x$'s being halogens and one and not more than two $x$'s being mercury.

II. Merucury derivatives of α-dihalogeno-β-dihalogeno-fluoresceins having most probably the general formula:

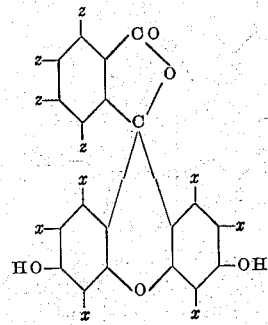

wherein $x$ represents hydrogen, halogen or mercury, two $x$'s being halogens and at least one and not more than two $x$'s being mercury, and $z$ represents hydrogen or halogen, two $z$'s being halogens.

III. Mercury derivatives of β-dihalogeno-fluoresceins having most probably the general formula:

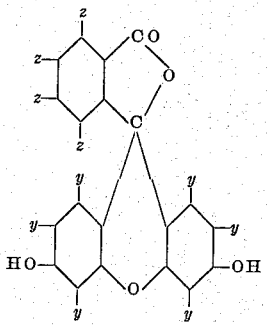

wherein $z$ represents hydrogen or halogen, two $z$'s being halogens, and $y$ represents hydrogen or mercury, at least one $y$ being mercury, and at least two $y$'s being hydrogen.

IV. Mercury derivatives of β-tetrahalogeno-fluoresceins having most probably the general formula:

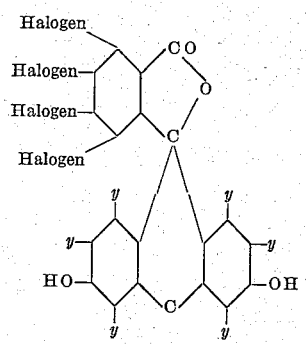

wherein $y$ represents hydrogen or mercury, at least one $y$ being mercury and at least two $y$'s being hydrogen, and wherein halogen represents bromine or iodine.

V. Mercury derivatives of α-dihalogeno-β-tetrahalogeno-fluoresceins having most probably the general formula:

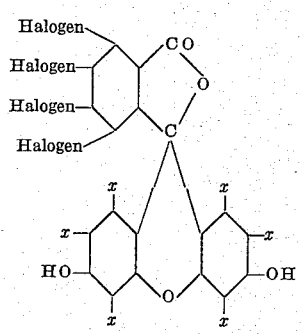

wherein $x$ represents hydrogen, halogen or mercury, two $x$'s being halogen and at least one and not more than two $x$'s being mercury.

In the foregoing formulæ, and in the appended claims, the expression "mercury" is to be understood as designating a mercury atom or a mercury-containing group which most probably is—HgOH.

Several examples will be given to illustrate the invention. In any example the particular type of reaction used may be substituted by either of the two alternative processes mentioned above and illustrated in other examples. Also, in any example the particular halogenated fluorescein may be replaced by the molecular equivalent of any other one included in the before mentioned several classes of parent substances.

Example I 72.1 grams of α-di-iodo-β-tetrachloro-fluorescein (0.1 gram molecule) are dissolved in 200 c. c. of normal sodium hydroxide solution, diluted to about 1 litre, and a solution of 32 grams (0.1 gram molecule) of mercuric acetate in 250 c. c. of water is added while mixing thoroughly. A precipitate forms. The mixture is heated, while being stirred, to a temperature of from 50–95° C. preferably about 90° C. until a sample no longer blackens with ammonium sulphide. The precipitate is filtered, washed, dried and treated with somewhat less alkali solution than is sufficent to effect complete solution, the solution is filtered and evaporated to dryness.

Instead of 32 grams of mercuric acetate, 64 grams may be used, thus giving a ratio of two atoms of mercury, instead of one atom, to each molecule of halogenated fluorescein.

Example II 58.4 grams (0.1 gram molecule) of α-di-iodo-fluorescein are dissolved in 200 c. c. of normal alkali diluted to 1 litre, and reprecipitated by the addition of 25 c. c. of glacial acetic acid mixed with 50 c. c. of water, with thorough stirring. A solution of 32 grams of mercuric acetate (0.1 gram molecule) in 250 c. c. of water, is mixed thoroughly with this suspension, and the whole heated to boiling until a sample no longer blackens with ammonium sulphide. It is then filtered, washed, dissolved in an amount of alkali solution somewhat less than sufficient to effect complete solution, and the solution is evaporated to dryness, preferably under reduced pressure. In place of 32 g. of mercuric acetate, 64 grams may be used in 500 c. c. of water, the process being otherwise the same.

Example III 64.8 grams (0.1 gram molecule) of β-tetrabrom-fluorescein are dissolved by the addition of 200 c. c. normal alkali, diluted to 1 litre, and 21.6 grams (0.1 gram molecule) of yellow mercuric oxide are added. With constant stirring the mixture is heated at a temperature of 50–95° C. until the oxide is dissolved, the solution is filtered and evaporated to dryness, preferably under reduced pressure. Instead of 21.6 grams of mercuric oxide two, three or four times this amount may be used.

*Example IV*

90 grams (0.1 gram molecule) of α-diiodo-β-tetrabrom-fluorescein are dissolved with 250 c. c. normal alkali, diluted to 1 litre, and reprecipitated with 25 c. c. of glacial acetic acid mixed with 50 c. c. of water, with vigorous stirring. A solution of 32 grams of mercuric acetate (0.1 gram molecule) in 250 c. c. of water is mixed thoroughly with the suspension, and the whole is heated to boiling until a sample no longer blackens with ammonium sulphide. It is then filtered, washed, dissolved in an amount of alkali solution, slightly less than sufficient to effect complete solution, and the filtered solution is evaporated to dryness, preferably under reduced pressure.

Twice the above amount of mercuric acetate may be used, the procedure being otherwise the same.

In the appended claim, the expression "mercury derivatives" embraces and is intended to embrace all possible mercury derivatives of the respective halogenated fluoresceins, and the free acids thereof as well as the alkali metal salts of the free acids.

The mercury introduced into the halogenated fluorescein molecule probably exists as a part of a group comprising also a negative atom or group such as $-OH$, $CH_3COO-$ or a halogen depending upon the compound of mercury employed in the mercuration. The references to mercury throughout the specification and appended claim will be understood to embrace such mercury containing groups.

I claim:

The mercury containing compounds of α-dihalogeno-β-tetrahalogeno fluoresceins, having the general formula:

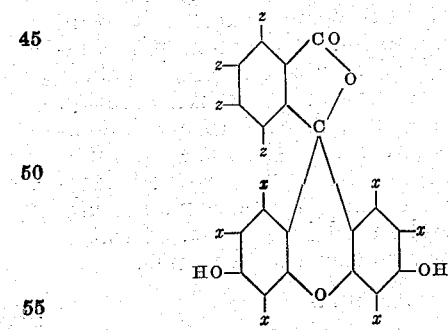

wherein Z represents halogen, and $x$ represents hydrogen, halogen or mercury, two $x$'s being halogen and at least one and not more than two $x$'s being mercury.

In testimony whereof, I affix my signature.

EDWIN C. WHITE.